(12) United States Patent
Minami et al.

(10) Patent No.: US 6,400,514 B2
(45) Date of Patent: Jun. 4, 2002

(54) ENDOSCOPE OBJECTIVE LENS

(75) Inventors: Itsuji Minami; Hitoshi Miyano, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/748,280

(22) Filed: Dec. 27, 2000

(30) Foreign Application Priority Data

Jan. 12, 2000 (JP) ........................................ 2000-003455

(51) Int. Cl.[7] .......................... G02B 21/02; G02B 15/14
(52) U.S. Cl. ........................................ 359/660; 359/682
(58) Field of Search .................................. 359/661, 680, 359/682

(56) References Cited

U.S. PATENT DOCUMENTS 4,704,007 A * 11/1987 Landre et al. .............. 359/661
4,984,878 A * 1/1991 Miyano ...................... 359/783

* cited by examiner

*Primary Examiner*—Scott J. Sugarman
(74) *Attorney, Agent, or Firm*—Snider & Associates; Ronald R. Snider

(57) ABSTRACT

In an objective lens mounted to an endoscope having an enlarging function and enabling a switch to wide-field viewing, a movable lens group is moved so as to adjust the amount of curvature of field such that the image quality at marginal parts of a picture becomes favorable according to the form of an object while keeping a substantially constant magnification.

7 Claims, 6 Drawing Sheets

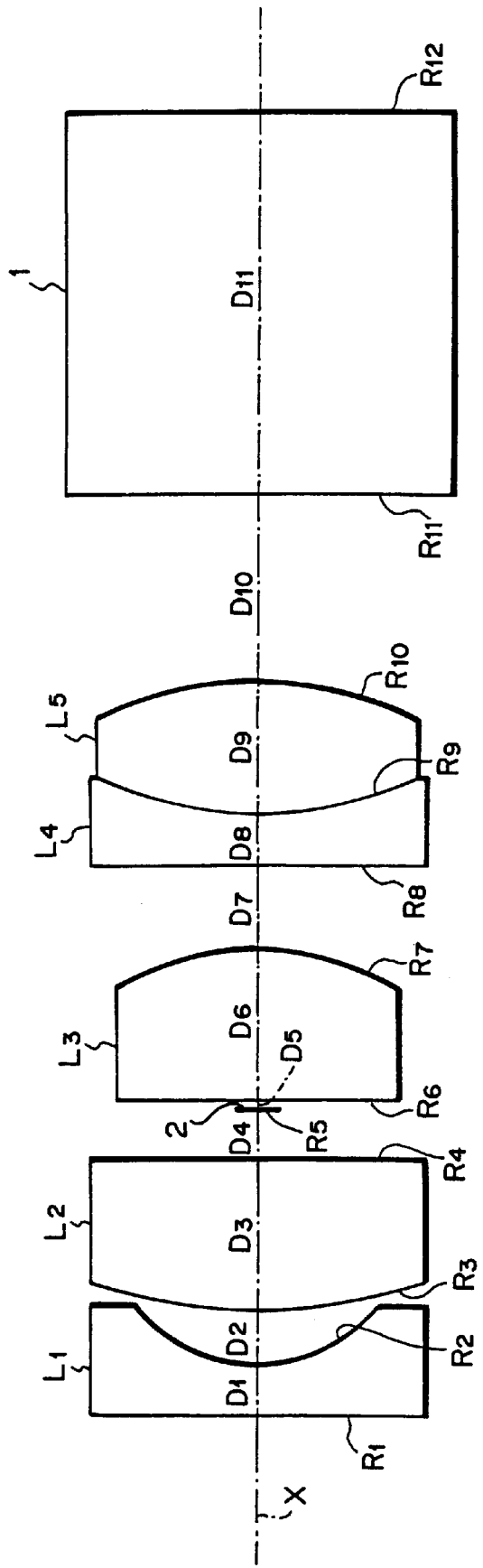

EXAMPLE 1
POSITION a

EXAMPLE 1
POSITION b

EXAMPLE 1
POSITION c

EXAMPLE 2

EXAMPLE 2
POSITION a

EXAMPLE 2
POSITION b

EXAMPLE 2
POSITION c

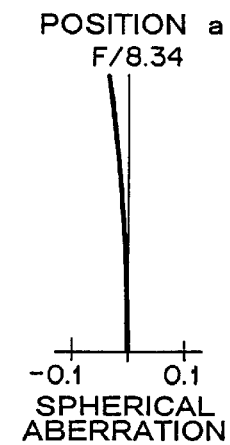

FIG.5A
EXAMPLE 1
POSITION a
F/8.34

-0.1  0.1
SPHERICAL
ABERRATION

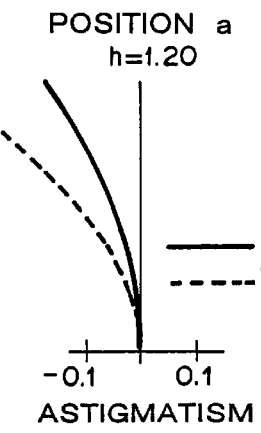

FIG.5B
EXAMPLE 1
POSITION a
h=1.20

—— SAGITTAL
----- TANGENTIAL

-0.1  0.1
ASTIGMATISM

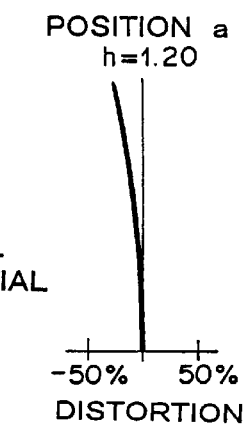

FIG.5C
EXAMPLE 1
POSITION a
h=1.20

-50%  50%
DISTORTION

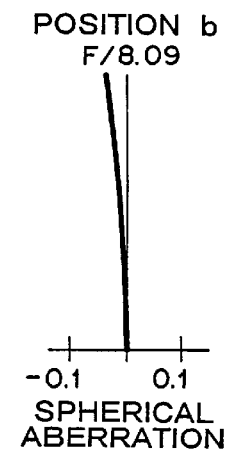

FIG.5D
EXAMPLE 1
POSITION b
F/8.09

-0.1  0.1
SPHERICAL
ABERRATION

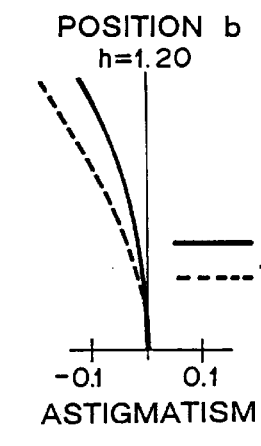

FIG.5E
EXAMPLE 1
POSITION b
h=1.20

—— SAGITTAL
----- TANGENTIAL

-0.1  0.1
ASTIGMATISM

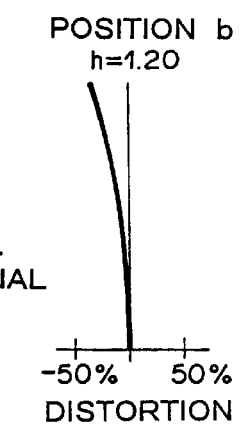

FIG.5F
EXAMPLE 1
POSITION b
h=1.20

-50%  50%
DISTORTION

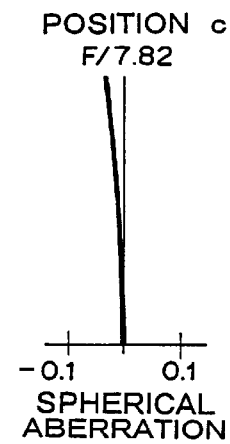

FIG.5G
EXAMPLE 1
POSITION c
F/7.82

-0.1  0.1
SPHERICAL
ABERRATION

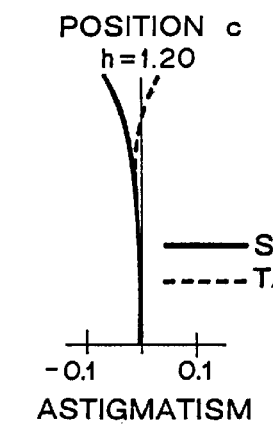

FIG.5H
EXAMPLE 1
POSITION c
h=1.20

—— SAGITTAL
----- TANGENTIAL

-0.1  0.1
ASTIGMATISM

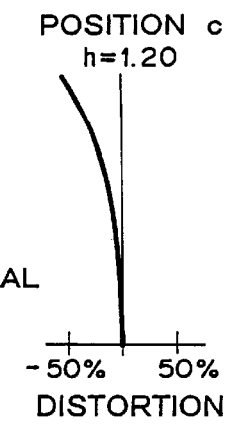

FIG.5I
EXAMPLE 1
POSITION c
h=1.20

-50%  50%
DISTORTION

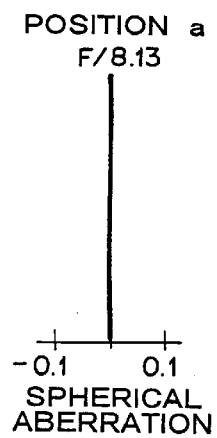

FIG.6A
EXAMPLE 2
POSITION a
F/8.13

SPHERICAL ABERRATION

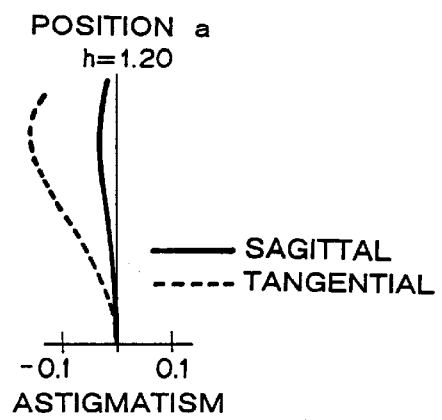

FIG.6B
EXAMPLE 2
POSITION a
h=1.20

—— SAGITTAL
---- TANGENTIAL

ASTIGMATISM

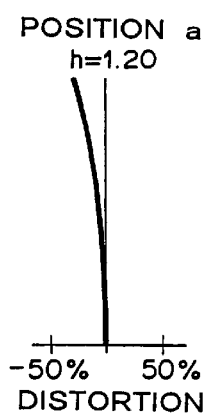

FIG.6C
EXAMPLE 2
POSITION a
h=1.20

DISTORTION

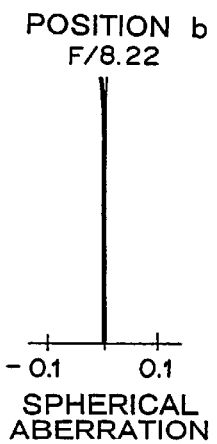

FIG.6D
EXAMPLE 2
POSITION b
F/8.22

SPHERICAL ABERRATION

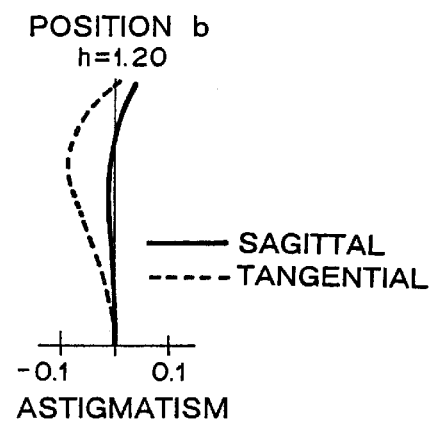

FIG.6E
EXAMPLE 2
POSITION b
h=1.20

—— SAGITTAL
---- TANGENTIAL

ASTIGMATISM

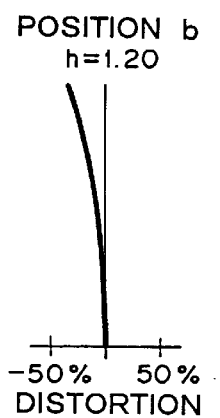

FIG.6F
EXAMPLE 2
POSITION b
h=1.20

DISTORTION

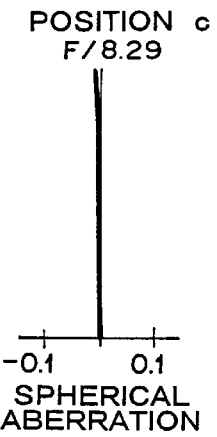

FIG.6G
EXAMPLE 2
POSITION c
F/8.29

SPHERICAL ABERRATION

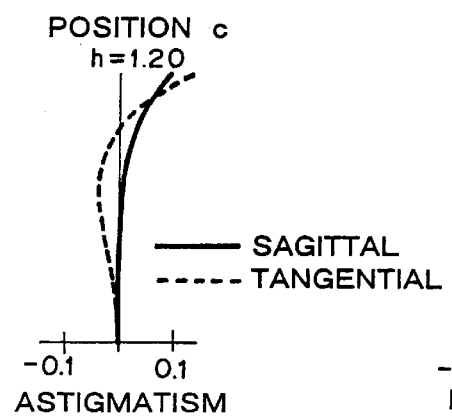

FIG.6H
EXAMPLE 2
POSITION c
h=1.20

—— SAGITTAL
---- TANGENTIAL

ASTIGMATISM

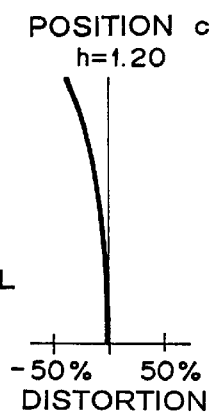

FIG.6I
EXAMPLE 2
POSITION c
h=1.20

DISTORTION

ENDOSCOPE OBJECTIVE LENS

RELATED APPLICATIONS

This application claims the priority of Japanese Patent Application No. 2000-003455 filed on Jan. 12, 2000, which is incorporated herein by reference.

BACKGROUND OF THE INVENTION

1. Field of the Invention

The present invention relates to an objective lens disposed at a front end part of an endoscope; and, in particular, to an endoscope objective lens equipped with a focusing mechanism.

2. Description of the Prior Art

In the field of electronic endoscope, there have been known general scopes (routine-only apparatus) suitable for wide-field viewing to which a fixed focus employed for general routine inspections (inspections in a complete physical examination and the like) is applied.

Meanwhile, optical enlargement type electronic endoscopes have recently come into use, which enable wide-field viewing and can observe a specific viewing site (in a field of view which extends about 2 to 5 mm from the viewing site) displayed on a monitor under a magnification of 70× to 100×, for example, by partly moving the objective optical system at the front end part of the endoscope in the optical axis direction.

In such an optical enlargement type electronic endoscope, due to demands from medical fields in practice, it is also absolutely necessary for an image displayed on a monitor at the time of normal viewing ranging about 5 to 100 mm from the viewing site (i.e., an image at the time of wide-field viewing) to yield the best image quality on a par with that of an image obtained when a general scope (routine-only apparatus) employing a fixed focus is used, whereby optical designing is carried out on the basis of such an idea.

Due to such circumstances, the optical enlargement type electronic endoscope is designed such that the image quality at the time of normal viewing ranging about 5 to 1000 mm from the viewing site is preferentially on a par with that of a general scope, whereby curvature of field remarkably increases at the time of enlarging the object in the optical enlargement type electronic endoscope.

Namely, if a lens is moved in the enlarging direction (field-narrowing direction) in order to carry out viewing under magnification in an optical enlargement type electronic endoscope, then the curvature of field greatly increases at marginal parts of a picture.

When viewing an object having a relatively flat form, a so-called floating mechanism may be used so as to absorb the curvature of field upon close-up (upon enlargement). However, the viewing distance often varies between the center part of picture and its marginal parts in object images to be viewed under magnification by an endoscope, as in protruded objects such as polyps, recessed objects such as ulcers, and so forth. Therefore, it is difficult for normal corrections for curvature of field to become effective. Namely, normal curvature corrections must be carried out while assuming that the object surface is flat, whereby there may occur a situation where marginal parts, in particular, are out of focus depending on the form of viewing site.

SUMMARY OF THE INVENTION

In view of the circumstances mentioned above, it is an object of the present invention to provide an endoscope objective lens mounted to an endoscope having an enlarging function and enabling a switch to wide-field viewing, which can appropriately correct the curvature of field occurring according to the form of a viewing site, and can yield an image which is in focus to marginal parts of a picture even at the time of close-up.

The endoscope objective lens in accordance with the present invention comprises at least one movable lens group, the movable lens group being movable so as to generate a curvature of field such that an image quality of a marginal part of a picture becomes favorable according to a form of an object while keeping a substantially constant magnification.

The endoscope objective lens may be an optical system having a variable focus or a fixed focus.

The endoscope objective lens may comprise, successively from the object side, a first lens group having a negative refracting power, a second lens group having a positive refracting power, and a third lens group having a positive refracting power;

the second and third lens group being movable along an optical axis so as to generate the curvature of field.

In this case, the endoscope objective lens may further comprise a stop disposed near a lens constituting the second lens group on the object side.

The endoscope objective lens may comprise, successively from the object side, a first lens group having a negative refracting power, a second lens group having a positive refracting power, a third lens group having a negative refracting power, and a fourth lens group having a positive refracting power;

the second and third lens group being movable along an optical axis so as to generate the curvature of field.

In this case, the endoscope objective lens may further comprise a stop disposed between lenses in the third lens group.

BRIEF DESCRIPTION OF THE DRAWINGS

FIG. 1 is a view showing the configuration of the endoscope objective lens in accordance with Example 1 of the present invention;

FIGS. 5A to 5I are graphs showing various kinds of aberration of the endoscope objective lens in accordance with Example 1 of the present invention; and FIGS. 6A to 6I are graphs showing various kinds of aberration of the endoscope objective lens in accordance with Example 2 of the present invention.

DESCRIPTION OF THE PREFERRED EMBODIMENTS

Figure 2A:
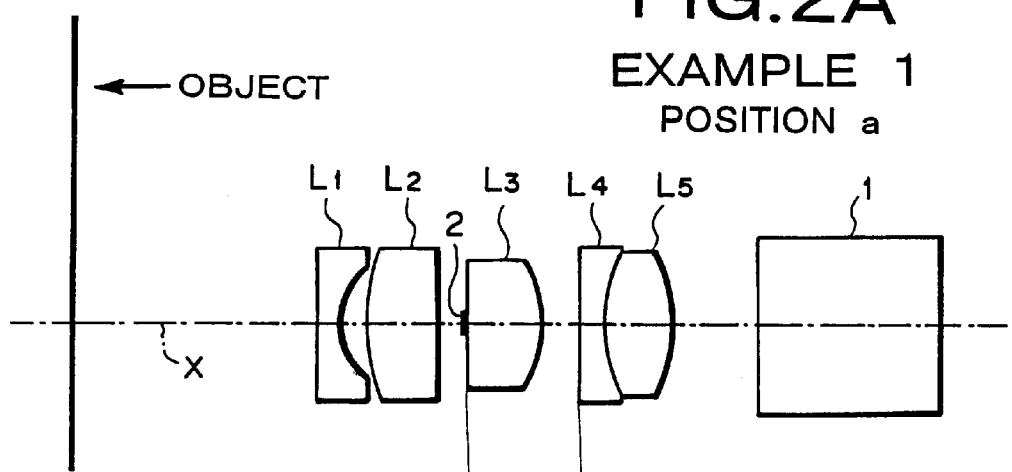
FIGS. 2A to 2C are views showing lens moving loci of the endoscope objective lens in accordance with Example 1 of the present invention.

In the following, endoscope objective lenses in accordance with embodiments of the present invention will specifically be explained with reference to Examples 1 and 2. The following data are standardized by the focal length of the whole system.

EXAMPLE 1

FIG. 1 shows a basic lens configuration in accordance with Example 1 of the present invention.

As shown in FIG. 1, the endoscope objective lens in accordance with Example 1 comprises, successively from the object side, a first lens group $G_1$ having a negative refracting power, and a second lens group $G_2$ and a third lens group $G_3$ each having a positive refracting power and being movable along an optical axis x.

The first lens group $G_1$ is fixed, whereas the second lens group $G_2$ and third lens group $G_3$ are movable along the optical axis x so as to make the focal length of the whole system longer than that at the time of normal viewing.

The first lens group $G_1$ comprises, successively from the object side, a first lens $L_1$ made of a plane-concave (negative) lens having a concave surface directed onto the image side, and a second lens $L_2$ made of a plane-convex (positive) lens having a convex surface directed onto the object side.

The second lens group $G_2$ comprises, successively from the object side, a brightness stop 2, and a third lens $L_3$ made of a plane-convex (positive) lens having a convex surface directed onto the image side.

The third lens group $G_3$ is constituted by a fourth lens $L_4$ made of a plane-concave lens having a concave surface directed onto the image side and a fifth lens $L_5$ made of a biconvex lens which are cemented together.

Further, a prism 1 for changing an optical path is disposed on the image side of the third lens group $G_3$, whereas a CCD device and an image guide fiber, to which image information is transmitted, are disposed on the image side of the prism 1 though they are not shown. In FIG. 1, x indicates the optical axis.

For enabling not only inspections of a specific site but also normal routine inspections, scopes having an enlarging function and enabling wide-field viewing ranging about 100 mm from the viewing site have recently come into use. Due to demands from medical fields in practice, such scopes are also optically designed such that an image in the normal viewing range from about 5 to 100 mm from the viewing site yields the best image quality as with a general scope (routine-only apparatus) to which a fixed focus is applied.

Due to such a situation, the falling of image field may become too much at marginal parts when the lens is moved in the enlarging direction in a scope having an enlarging function and enabling a switch to wide-field viewing from a position distanced from the viewing site by about 100 mm. Thus, the curvature of field or the like at marginal parts of a picture becomes much greater in the case where the lens is moved to a narrow-field position (1 to 2 mm from the viewing site) in a zoom scope than in the case where the lens is set to a close-up side position (about 5 mm from the viewing site) in a routine-only apparatus.

Also, the viewing distance often varies between the center part of picture and its marginal parts in object images to be viewed under magnification by an endoscope, as in protruded objects such as polyps, recessed objects such as ulcers, and so forth, whereby marginal parts of a picture may not be in focus in particular.

Therefore, in this Example, the curvature of field occurring according to the protruded/recessed form of an object surface is corrected by its opposite curvature of field generated when the second lens group $G_2$ and third lens group $G_3$ are moved, whereby a favorable focus is obtained in the whole picture.

Figure 2B:
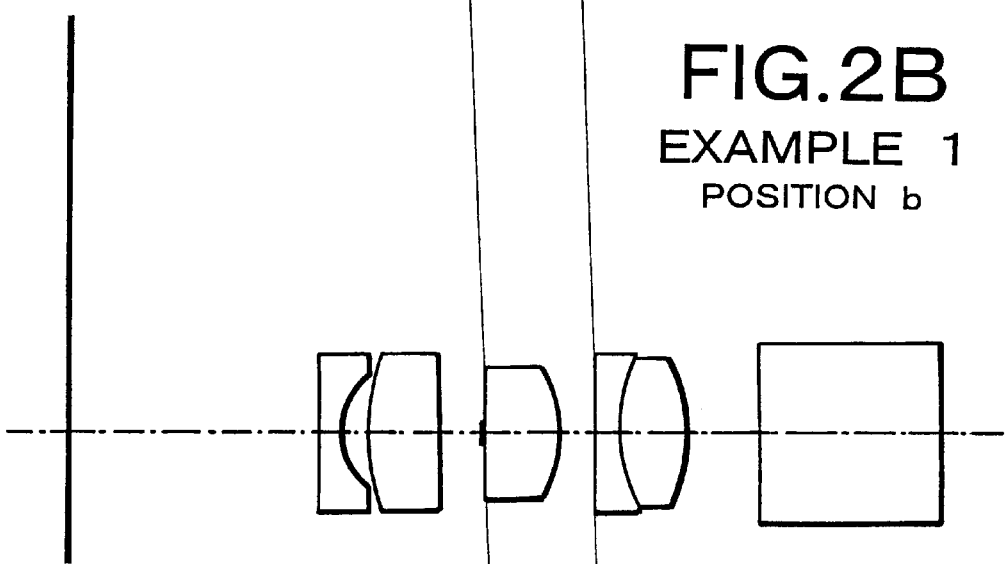
Figure 2C:
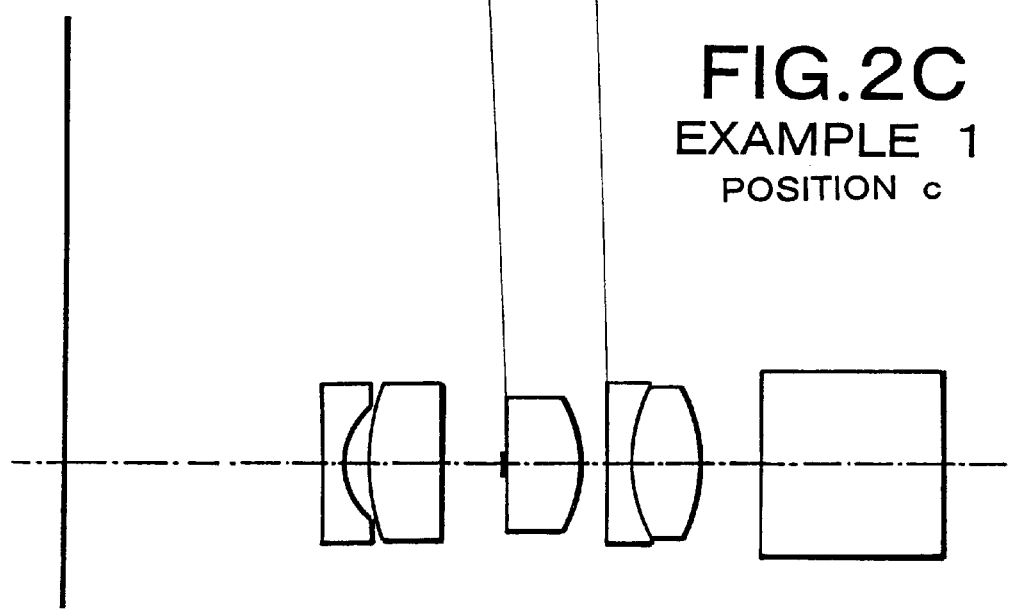

FIGS. 2A to 2C show how the second lens group $G_2$ and third lens group $G_3$ move in Example 1, whereas FIGS. 5A to 5I show various kinds of aberration (spherical aberration, astigmatism, and distortion) at positions a, b, c in FIGS. 2A to 2C. In FIGS. 2A to 2C, though positions a, b, c are those at the time of close-up, they are adjusted such that the amount of curvature of field generated thereby successively shifts from the under side to the over side from the position a to c. Therefore, according to the protruded/recessed form of the object, an operator moves the second lens group $G_2$ and third lens group $G_3$ to positions generating an optimal amount of curvature of field for correcting the protruded/recessed form. In FIGS. 2A to 2C, the vertical line at the left end indicates the object position, whereas h in FIGS. 5A to 5I indicates the image height.

In this Example, the brightness stop 2 is disposed near the third lens $L_3$ constituting the second lens group $G_2$ on the object side, and is movable along with the movement of third lens $L_3$.

The upper part of Table 1 shows the radius of curvature R of each lens surface, the axial surface space of each lens (the center thickness of each lens and the air space between each pair of neighboring lenses) D, and refractive index N and Abbe number v of each lens at d-line in Example 1. In Table 1 (as in Table 2), numbers referring to each letter successively increase from the object side.

The lower part of Table 1 shows values of air space D for the best focus point at a standard object distance and the positions a, b, c in FIGS. 2A to 2C. Here, *1 is the air gap between the fourth surface and the fifth surface (stop), *2 is the air gap between the seventh surface and the eighth surface, and *3 is the air gap between the tenth surface and the eleventh surface.

TABLE 1

| Surface | R | D | Nd | vd | |
|---|---|---|---|---|---|
| 1 | ∞ | 0.400 | 1.88300 | 40.9 | |
| 2 | 1.175 | 0.420 | | | |
| 3 | 4.059 | 1.180 | 1.80518 | 25.4 | |
| 4 | ∞ | 0.800 | | | *1 |
| 5 | ∞ | 0.040 | (Stop) | | |
| 6 | ∞ | 1.200 | 1.71301 | 53.9 | |
| 7 | −2.128 | 0.800 | | | *2 |
| 8 | ∞ | 0.400 | 1.80518 | 25.4 | |
| 9 | 2.784 | 1.070 | 1.71301 | 53.9 | |
| 10 | −2.784 | 0.827 | | | *3 |
| 11 | ∞ | 3.000 | 1.55920 | 53.9 | |
| 12 | ∞ | | | | |

| | Standard | Position a | Position b | Position c |
|---|---|---|---|---|
| Object distance | 13 | 4 | 4 | 4 |
| *1 | 0.8 | 0.4 | 0.7 | 1 |
| *2 | 0.8 | 0.619 | 0.558 | 0.435 |
| *3 | 0.8266 | 1.4076 | 1.1686 | 0.9916 |

EXAMPLE 2

Figure 3:
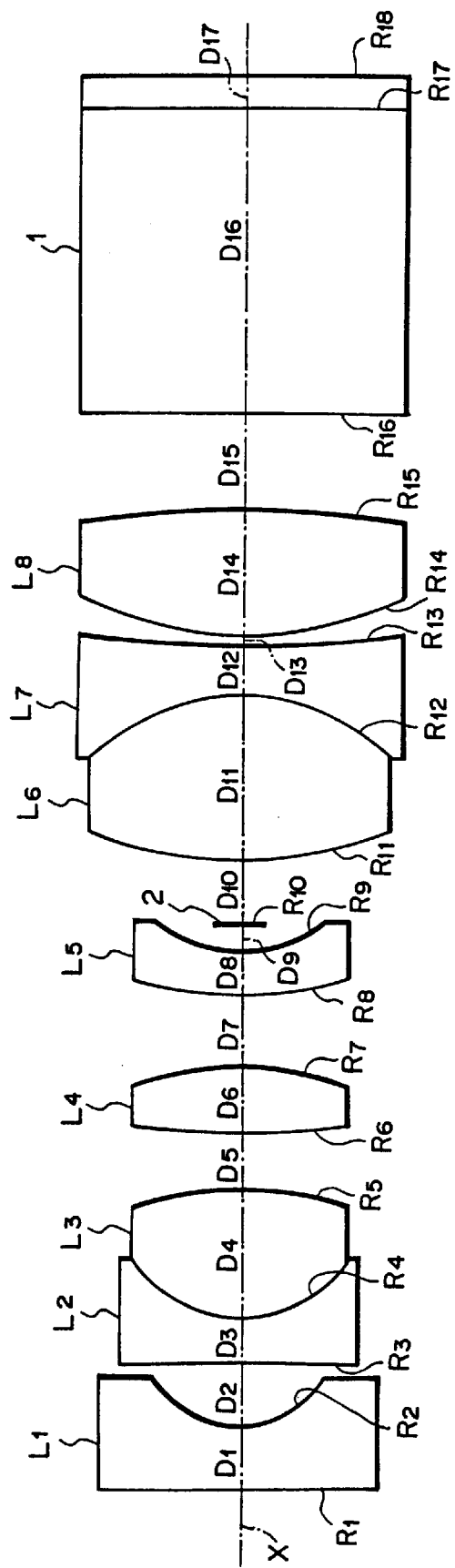
FIG. 3 is a view showing the configuration of the endoscope objective lens in accordance with Example 2 of the present invention.

FIG. 3 shows a basic lens configuration in accordance with Example 2 of the present invention.

As shown in FIG. 3, the endoscope objective lens in accordance with Example 2 comprises, successively from the object side, a first lens group $G_1$ having a negative refracting power, a second lens group $G_2$ having a positive refracting power and being movable along an optical axis x, a third lens group $G_3$ having a negative refracting power and being movable along the optical axis x, and a fourth lens group $G_4$ having a positive refracting power.

The first lens group $G_1$ and fourth lens group $G_4$ are fixed, whereas the second lens group $G_2$ and third lens group $G_3$ are movable along the optical axis x so as to make the focal length of the whole system longer than that at the time of normal viewing.

The first lens group $G_1$ comprises, successively from the object side, a first lens $L_1$ made of a plane-concave (negative) lens having a concave surface directed onto the image side, and a cemented lens constituted by a second lens $L_2$ made of a plane-concave (negative) lens having a concave surface directed onto the image side and a third lens $L_3$ made of a biconvex lens.

The second lens group $G_2$ is constituted by a fourth lens $L_4$ made of a biconvex lens.

The third lens group $G_3$ is constituted by a fifth lens $L_5$ made of a negative meniscus lens having a concave surface directed onto the image side.

The fourth lens group $G_4$ comprises a cemented lens constituted by a sixth lens $L_6$ made of a biconvex lens and a seventh lens $L_7$ made of a biconcave lens, and an eighth lens $L_8$ made of a biconvex lens.

Further, a prism 1 for changing an optical path is disposed on the image side of the fourth lens group $G_4$, whereas a CCD device and an image guide fiber, to which image information is transmitted, are disposed on the image side of the prism 1 though they are not shown. In FIG. 3, x indicates the optical axis.

In this Example, as shown in FIG. 3 and the following Table 2, a stop 2 is disposed near the fifth lens $L_5$ on the image side on the optical axis x, so as to be movable along with the movement of fifth lens $L_5$.

In this Example, as in the above-mentioned Example 1, the second lens group $G_2$ and third lens group $G_3$ are moved so as to actively generate an opposite curvature of field, thus adjusting focus according to the protruded/recessed form of an object surface, thereby yielding a favorable focus in the whole picture.

Figure 4A:
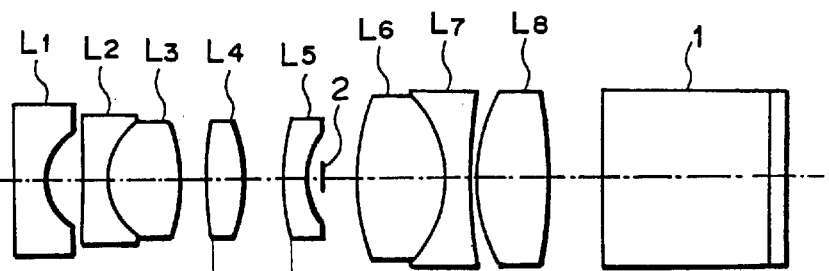
FIGS. 4A to 4C are views showing lens moving loci of the endoscope objective lens in accordance with Example 2 of the present invention.
Figure 4B:
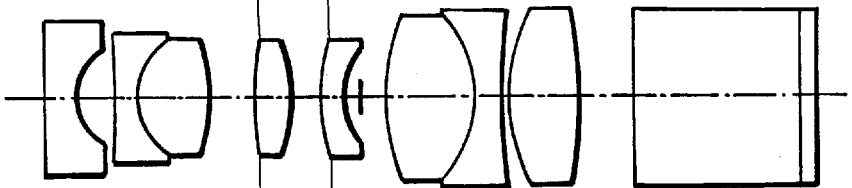
Figure 4C:
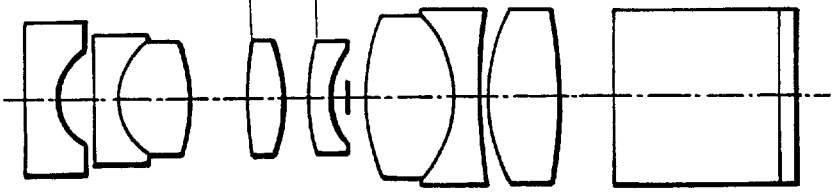

FIGS. 4A to 4C show how the second lens group $G_2$ and third lens group $G_3$ move in Example 2, whereas FIGS. 6A to 6I show various kinds of aberration (spherical aberration, astigmatism, and distortion) at positions a, b, c in FIGS. 4A to 4C. In FIGS. 4A to 4C, while positions a, b, c are those at the time of close-up, they are adjusted such that the amount of curvature of field generated thereby successively shifts from the under side to the over side from the position a to C. Therefore, according to the protruded/recessed form of the object, an operator moves the second lens group $G_2$ and third lens group $G_3$ to a position generating an optimal amount of curvature of field for correcting the protruded/recessed form. In FIGS. 4A to 4C, the vertical line at the left end indicates the object position, whereas h in FIGS. 6A to 6I indicates the image height.

The upper part of Table 2 shows the radius of curvature R of each lens surface, the axial surface space of each lens (the center thickness of each lens and the air space between each pair of neighboring lenses) D, and refractive index N and Abbe number v of each lens at d-line in Example 2.

The lower part of Table 2 shows values of air space D for the best focus point at a standard object distance and the positions a, b, c in FIGS. 4A to 4C. Here, *1 is the air gap between the fourth surface and the fifth surface, *2 is the air gap between the seventh surface and the eighth surface, and *3 is the air gap between the tenth surface (stop) and the eleventh surface.

TABLE 2

| Surface | R | D | Nd | vd | |
|---|---|---|---|---|---|
| 1 | ∞ | 0.600 | 1.88300 | 40.9 | |
| 2 | 0.936 | 0.566 | | | |
| 3 | −35.931 | 0.400 | 1.80518 | 25.4 | |
| 4 | 1.175 | 1.201 | 1.80440 | 39.6 | |
| 5 | −3.212 | 0.800 | | | *1 |
| 6 | 7.978 | 0.603 | 1.80440 | 39.6 | |
| 7 | −2.744 | 0.200 | | | *2 |
| 8 | 3.604 | 0.400 | 1.80400 | 46.6 | |
| 9 | 1.299 | 0.240 | | | |
| 10 | ∞ | 0.80 | (Stop) | | *3 |
| 11 | 3.874 | 1.50 | 1.71301 | 53.9 | |
| 12 | −1.989 | 0.45 | 1.80518 | 25.4 | |
| 13 | 11.175 | 0.10 | | | |
| 14 | 3.333 | 1.20 | 1.72917 | 54.7 | |
| 15 | −8.808 | 0.88 | | | |
| 16 | ∞ | 2.80 | 1.55920 | 53.9 | |
| 17 | ∞ | 0.30 | 1.51633 | 64.1 | |
| 18 | ∞ | | | | |

| | Standard | Position a | Position b | Position c |
|---|---|---|---|---|
| Object distance | 15 | 4 | 4 | 4 |
| *1 | 0.8 | 0.5 | 0.8 | 1 |
| *2 | 0.2 | 0.689 | 0.5335 | 0.445 |
| *3 | 0.8 | 0.611 | 0.4665 | 0.355 |

Operations and effects concerning the focusing at marginal parts of a picture in Example 2 are substantially the same as those in the above-mentioned Example 1.

Without being restricted to the above-mentioned Examples, the endoscope objective lens of the present invention can be modified in various manners. For example, the radius of curvature R and lens space (or lens thickness) D of each lens can be altered as appropriate.

Also, aspheric surfaces, GRIN lenses, and diffraction optical elements may be used in addition to or in place of constituents of the endoscope objective lenses in accordance with Examples, so as to correct chromatic aberration and other kinds of aberration.

The present invention is also applicable to fixed-focus objective optical systems as a matter of course.

As explained in the foregoing, the present invention provides an endoscope objective lens mounted to an endoscope having an enlarging function and enabling a switch to wide-field viewing, in which a movable lens group is moved so as to adjust the amount of curvature of field such that the image quality at marginal parts of a picture becomes favorable according to the form of an object while keeping a substantially constant magnification. Consequently, the curvature of field occurring according to the form of a viewing site can be corrected appropriately, whereby an image which is in focus to marginal parts of a picture can be obtained even at the time of close-up.

What is claimed is:

1. An endoscope objective lens comprising at least one movable lens group, said movable lens group being movable so as to improve field curvature correction wherein an image of a marginal part of a picture of an object is corrected while keeping magnification substantially constant.

2. An endoscope objective lens according to claim 1, wherein said endoscope objective lens is an optical system having a variable focus.

3. An endoscope objective lens according to claim 1, wherein said endoscope objective lens is an optical system having a fixed focus.

4. An endoscope objective lens according to claim 1, wherein said endoscope objective lens comprises, successively from the object side, a first lens group having a negative refracting power, a second lens group having a positive refracting power, and a third lens group having a positive refracting power;

said second and third lens group being movable along an optical axis so as to generate said field curvature correction.

5. An endoscope objective lens according to claim 4, further comprising a stop disposed near a lens constituting said second lens group on the object side.

6. An endoscope objective lens according to claim 1, wherein said endoscope objective lens comprises, successively from the object side, a first lens group having a negative refracting power, a second lens group having a positive refracting power, a third lens group having a negative refracting power, and a fourth lens group having a positive refracting power;

said second and third lens group being movable along an optical axis so as to generate said curvature correction.

7. An endoscope objective lens according to claim 6, further comprising a stop disposed between lenses in said third lens group.

* * * * *

UNITED STATES PATENT AND TRADEMARK OFFICE
CERTIFICATE OF CORRECTION

PATENT NO. : 6,400,514 B1  
DATED : June 4, 2002  
INVENTOR(S) : Itsuji Minami and Hitoshi Miyano It is certified that error appears in the above-identified patent and that said Letters Patent is hereby corrected as shown below:

Column 8,
Line 7, after "to generate said" insert -- field --.

Signed and Sealed this

Thirty-first Day of December, 2002

JAMES E. ROGAN  
*Director of the United States Patent and Trademark Office*